US007027770B2

(12) United States Patent
Judd et al.

(10) Patent No.: US 7,027,770 B2
(45) Date of Patent: Apr. 11, 2006

(54) REPEATER FOR CUSTOMER PREMISES

(75) Inventors: Mano D. Judd, Rockwall, TX (US); James L. Alford, Garland, TX (US)

(73) Assignee: Andrew Corporation, Orland Park, IL (US)

( * ) Notice: Subject to any disclaimer, the term of this patent is extended or adjusted under 35 U.S.C. 154(b) by 521 days.

(21) Appl. No.: 10/152,923

(22) Filed: May 21, 2002

(65) Prior Publication Data

US 2002/0177401 A1 Nov. 28, 2002

Related U.S. Application Data

(60) Provisional application No. 60/292,762, filed on May 22, 2001.

(51) Int. Cl.
*H04B 7/15* (2006.01)

(52) U.S. Cl. .......................... 455/11.1; 455/15; 455/25

(58) Field of Classification Search ............... 455/11.1, 455/15, 25; 375/213; 320/226, 242, 345, 320/315

See application file for complete search history.

(56) References Cited

U.S. PATENT DOCUMENTS

| | | | | |
|---|---|---|---|---|
| 5,600,333 | A * | 2/1997 | Justice et al. | 343/713 |
| 5,930,728 | A * | 7/1999 | Evanyk | 455/561 |
| 5,982,103 | A | 11/1999 | Mosebrook et al. | 315/149 |
| 6,047,177 | A | 4/2000 | Wickman | 455/422 |
| 6,128,471 | A * | 10/2000 | Quelch et al. | 455/25 |
| 6,215,451 | B1 | 4/2001 | Hadzoglou | 343/715 |
| 6,633,743 | B1 * | 10/2003 | Berlinsky | 455/11.1 |
| 2004/0097189 | A1 * | 5/2004 | Bongfeldt et al. | 455/7 |

FOREIGN PATENT DOCUMENTS

| | | | |
|---|---|---|---|
| EP | 000833403 | A2 * | 9/1997 |
| EP | 1 071 160 | A2 | 1/2001 |
| JP | 01 077230 | | 3/1989 |
| JP | 64-077230 | * | 3/1989 |

OTHER PUBLICATIONS

*International Search Report*, for PCT/US 02/16296, mailed Jan. 10, 2002.

* cited by examiner

*Primary Examiner*—Tilahun Gesesse
*Assistant Examiner*—Angelica M. Perez

(57) ABSTRACT

A repeater for use in connection with enhancing reception of wireless communications in an architectural structure utilizes a housing that incorporates both a null antenna capable of being oriented to provide an antenna beam directed into an interior portion of the architectural structure, and a repeater circuit that is configured to provide bi-directional exchange of radio frequency signals between the null antenna and a donor antenna. The donor antenna may also be mounted to the housing, or alternatively may be coupled to the housing via a cable or other communications path. The repeater is suitable for installation in an attic, or alternatively, within a room or other inhabitable area of a structure.

37 Claims, 3 Drawing Sheets

REPEATER FOR CUSTOMER PREMISES

RELATED APPLICATIONS

This application claims the filing benefit and priority of U.S. Provisional Application entitled "Repeater for Customer Premises," Ser. No. 60/292,762, filed May 22, 2001, and incorporates that application by reference herein in its entirety.

FIELD OF THE INVENTION

This invention is directed generally to wireless communications and more particularly to a consumer unit for facilitating receipt and transmission of wireless communications at the customer premises.

BACKGROUND OF THE INVENTION

Various mobile communication services such as cellular telephones, using PCS or other radio frequency (RF) protocols are becoming increasingly widespread. Many consumers have gone so far as considering eliminating so-called land-line telephone service in favor of wireless services. Accordingly, for many such cellular customers, it has become increasingly desirable to obtain clear signals within the home or residence.

However, the provision of reliable wireless communication services within the customer home or residence has presented several attendant problems. Among these problems, is maintaining adequate signal gain and directionality within the residence to adequately communicate with a remote cell tower. In this regard, many residences are constructed with foil-backed insulation, such that the foil backing interferes with the reception and transmission of radio signals from inside of the residence. Often, consumers find they must stand adjacent a window or in another area which is relatively transparent to radio frequencies, or even step outside of the residence to obtain acceptable performance from the mobile communications unit or cell phone.

While some in-building communications systems have been proposed, problems remain. For example, most heretofore described in-building communications systems, that is, for distributing wireless communications signals within a building or other structure, require relatively high gain in order to adequately redistribute or repeat these signals within the structure. Such high gain can cause the system to oscillate or become unstable, producing a considerable quantity of "noise" back to the base station or cell tower. This generation of excess noise is generally unacceptable to system operators because it can interfere with overall cell tower or base station operation.

Moreover, for a consumer installation, the system should be as simple and inexpensive as possible so that installation can be done by the consumer or by relatively unskilled workers. In this regard, some problems attendant with such systems are properly positioning the various elements, properly aiming a donor antenna for optimum communications with the closest cell tower and otherwise positioning components so as to maximize isolation between respective null and donor antennas. In this regard, the system of the invention essentially comprises a repeater type of apparatus wherein the donor antenna is designated it for communication with the cell tower and the null antenna is designated it for communication with the customer equipment such as a cellular telephone or the like.

DETAILED DESCRIPTION OF THE ILLUSTRATED EMBODIMENT

While several embodiments of the invention have been shown and will be described hereinafter, it will be understood that the invention is not limited to the specific embodiments described. For example, while the illustrated embodiments show particular combinations of elements, those skilled in the art may recognize one or more different subcombinations or manners in which various elements from the various embodiments may be combined to form yet other embodiments, subcombinations or variations.

The herein-described embodiments utilize a repeater for use in connection with enhancing reception of wireless communications in an architectural structure using a housing that incorporates both a null antenna capable of being oriented to provide an antenna beam directed into an interior portion of the architectural structure, and a repeater circuit that is configured to provide bi-directional exchange of radio frequency signals between the null antenna and a donor antenna. As will become more apparent below, the donor antenna may also be mounted to the housing, or alternatively coupled to the housing via a cable or other communications path.

In some embodiments, the repeater is installed within an attic of an architectural structure, with the donor antenna desirably mounted as high as feasible within the attic, e.g., to maximize communication efficiency with a remote cell tower. The housing and null antenna, on the other hand, are oriented so as to direct an antenna beam (from a transmission and/or reception standpoint) toward a ceiling of a room or other inhabitable area of the architectural structure over which the attic is disposed. In certain embodiments, the donor antenna may be spatially separated from the housing and null antenna to improve isolation, whereby the housing and null antenna may be positioned closer to the ceiling below the attic. In other embodiments, the donor antenna may be mounted to the housing, with all of the housing, donor antenna and null antenna mounted at a relatively high point in the attic.

In still other embodiments, the housing and null antenna may be mounted directly within an inhabitable portion of an architectural structure, e.g., to the ceiling and/or at least one wall, or in a corner formed by a ceiling and/or one or more walls. The donor antenna may then be mounted outside of the architectural structure, or optionally, inside the structure but proximate a window.

Figure 1:
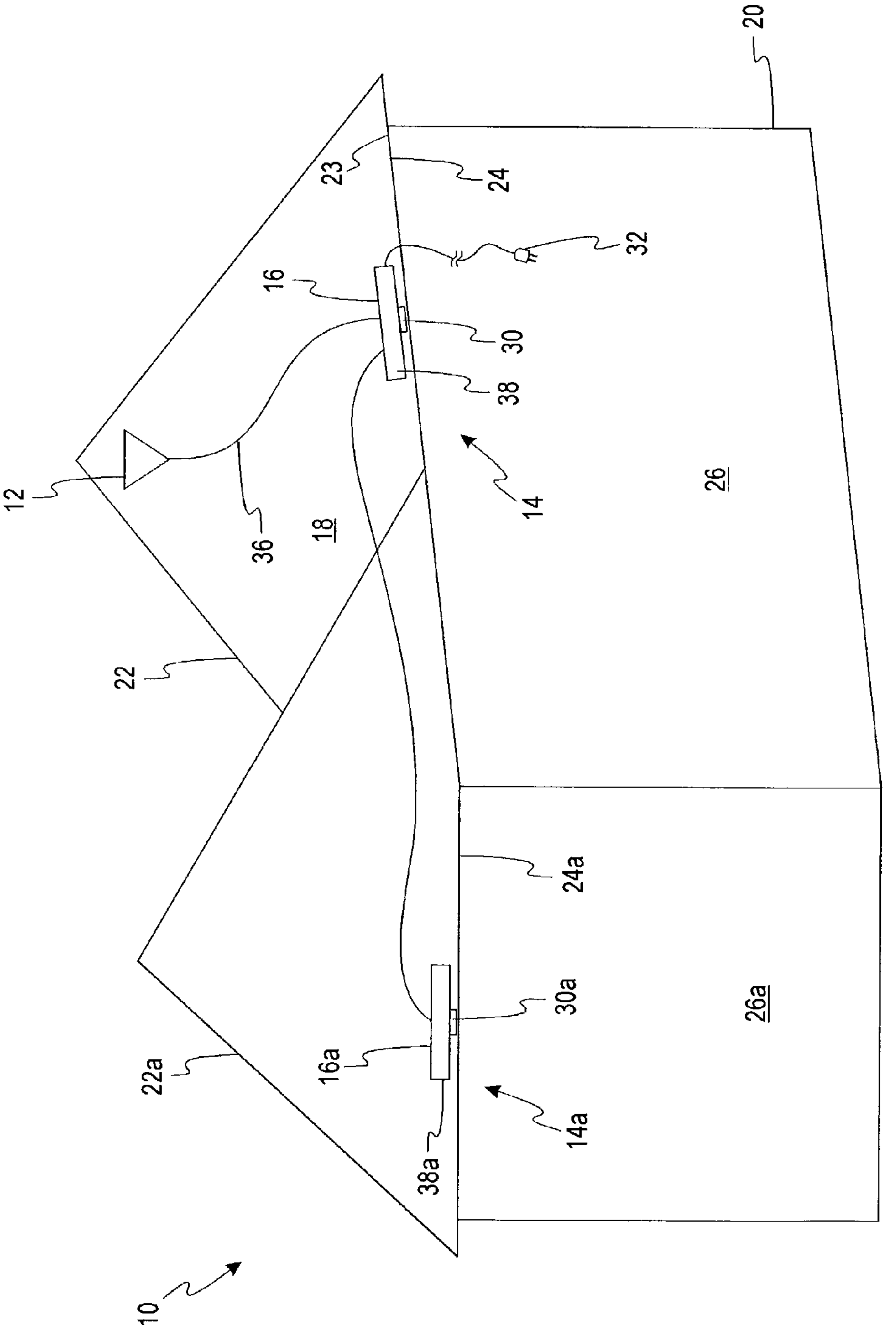
FIG. 1 is a simplified diagram showing a consumer premises repeater system in accordance with one aspect of the invention.

Referring initially to FIG. 1, there is shown a consumer premises or residential communication or repeater system designated generally by the reference numeral 10. Repeater or antenna system 10 includes at least one donor antenna 12 which may be an omnidirectional antenna, or alternatively, a directional antenna. An omnidirectional antenna may be utilized which yields approximately 8 dB of gain, although higher or lower gains may also be sued.

In the case of a directional antenna, additional structure (not illustrated herein) could be provided for facilitating proper aiming of the antenna to obtain an optimum signal from a cell tower. Such structure means may include one or more LED's or other observable indicia, combined with a signal strength detection circuit, to produce a user observable display corresponding to relative signal strength, to enable simple aiming of the antenna 12.

A subscriber or null antenna 14 is also provided for providing maximum coverage of a given area of the consumer premises, such as one or more of the inhabitable rooms 26 thereof. Other rooms or other areas 26*a* may be serviced in the same fashion, by one or more additional null antennas, such as null antenna 14*a* shown in FIG. 1. This antenna 14*a* may be coupled with the donor antenna 12, or may be "daisy chained" off the first null antenna 14 as indicated diagrammatically in FIG. 1. In this regard, the second or additional null antenna 14*a* may be located within a second or further roof mass, whereby direct access to the donor antenna 12 may be somewhat difficult.

A repeater circuit, including electronics such as one or more low noise amplifiers (LNA's) for amplifying a receive signal and one or more power amplifiers (PA's) (not shown in FIG. 1) may be provided in connection with the null antennas 14 and 14*a*. In this regard, each of the null antennas 14 and 14*a* may have a similar construction, whereby the construction of antenna 14 will be described in additional detail.

The null antenna 14 is mounted to a housing 16, which in the embodiment of FIG. 1 is mounted on or relatively close to a floor or bottom surface of an attic portion 18 of a residential structure 20. This attic 18 has a pitched roofed surface 22 and a floor, which is located directly above a ceiling surface 24 of a room 26 to be serviced by the communication system of the invention. The above-mentioned repeater circuit (not shown) may be enclosed within the housing 16, and a radiating antenna element such as a patch or dipole 30, or an array of such elements, is mounted to a surface of the housing 16 facing into the room 26. Like elements and components of the antenna 14*a* are indicated by the like reference numerals with the suffix "a." A power source such as a household AC wire or circuit 32 may be provided as a power source to the electronics within the housing 16, which may further include a suitable DC converter or power supply for this purpose.

In the embodiment of FIG. 1, the donor antenna 12 is mounted as a relatively high point in the attic, typically as high as is feasible within the attic, that is, as close as possible to a peak portion of the pitched roof 22. One or more wires or cables 36 may be provided for carrying RF signals bi-directionally between the antennas 12 and 14. Other communication paths for carrying these signals between the two antennas may be utilized, including fiber optic, various types of wire, or even a wireless communications protocol such as blue tooth or 802.11; however, such wireless protocols would require the provision of further electronics (not shown) associated with both of the antennas 12 and 14.

The repeater circuit may also include a chipset or controllable switch (not shown) to enable the service provider to turn the null antenna on and off in response to a suitable control signal sent to the donor antenna 12, or else to otherwise disable the system, if necessary. This might be done in the event that the system becomes unstable, oscillates, or otherwise generates an unacceptable noise level back to the cell tower.

Additional circuitry, e.g., isolation or cancellation circuitry, beam steering circuitry, orientation circuitry (e.g., to orient the donor antenna for optimum reception), filtering circuitry and amplification circuitry, as well as other circuitry utilized in various known repeater designs, may also be incorporated into the repeater circuit consistent with the invention. Moreover, in some embodiments separate receive and transmit antenna elements may be used for the null and/or donor antennas, with appropriate circuitry in the repeater circuit utilized to separately handle uplink and downlink communications as appropriate.

In addition to the above-described structure, the housing 16 also provides a relatively large, flat ground plane or backplane surface 38 upon which the radiating element 30 is mounted, to improve isolation. This backplane may also be surrounded by one or more chokes 202 (see FIG. 2) to further enhance isolation, if necessary. In one embodiment, it is contemplated that the ground plane 38 may form a substantially rectangular or square surface on the order of 15 inches on each side. Other geometries, e.g., circular, elliptical, etc., may also be used in the alternative. Furthermore, the geometry for the housing may also vary in a number of manners consistent with the invention.

To minimize feedback between the antennas 12, 14, it is desirable to fashion the antenna system 10 in such a manner to provide relatively high isolation between the antennas 12, 14. For example, in the embodiment of FIG. 1, the donor antenna 12 and null antenna 14 are orthogonally polarized, e.g., vertical polarization for the donor antenna 12 and horizontal polarization for the null antenna 14. Moreover, the directions of propagation for the signals communicated by these antennas are likewise orthogonally oriented, e.g., in a direction generally parallel to the ground for antenna 12 for communication with a cell tower (although some additional elevational deviation may be required to communicate with a relatively close and/or tall tower), and generally downwardly, and perpendicular to the ground, for antenna 14. Further isolation may also be provided by the spacing or spatial isolation between the respective donor and null antennas 12, 14 in the embodiment of FIG. 1.

In this embodiment, isolation of at least from about 30 to about 40 dB is desirable, with about 70 to about 90 or more dB being even more desirable. The length of the cable 36, and hence space between the antennas, may be on the order of 6 to 8 feet consistent with this amount of isolation.

Figure 2:
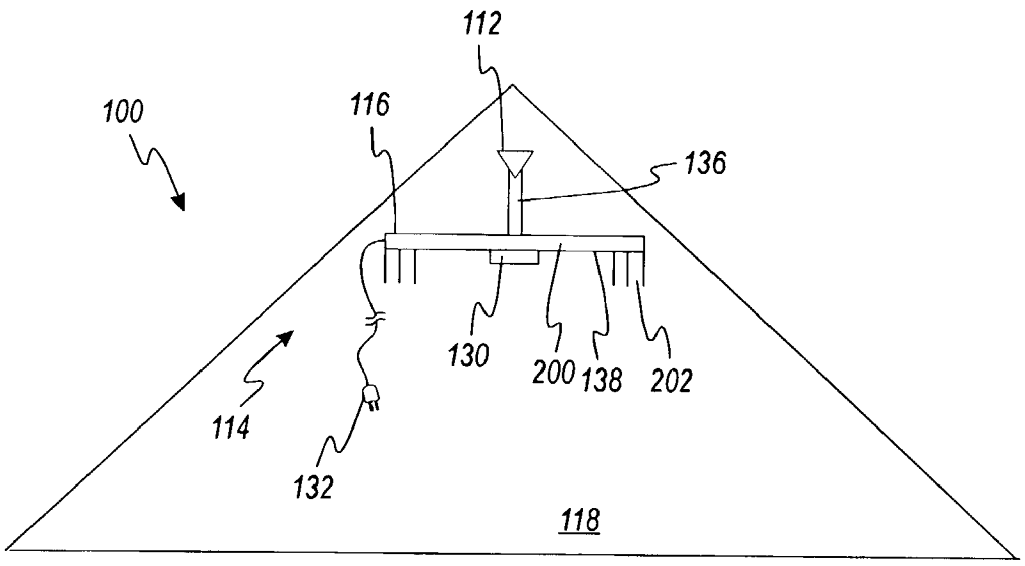
FIG. 2 shows a simplified diagram showing a consumer premises repeater system in accordance with another embodiment of the invention.

Referring next to FIG. 2, a second embodiment of consumer premises repeater system 100 is illustrated. The system or installation 100 is similarly located within an attic space 118 under a pitched roof 122 of a residential structure or home. The antenna system or installation 100 of FIG. 2 is provided essentially as a one-piece, self-contained module, requiring no wiring beyond the provision of a power cord or wire 132. The module 100 is placed as close as feasible to a peak of the pitched roof 122. In this regard, the part of the module nearest the roof peak comprises a donor antenna 112 which is mounted on a short mast or mounting projection 136, which communicates with the body of a housing 116 from which this mast or post 136 projects. In one practical embodiment, the length of the post 136 may be on the order of 4–6 inches. In addition, the donor antenna 112 is mounted on the housing 116 opposite from the surface to which null antenna 130 is mounted.

A repeater circuit 200, optionally including an electronics monitor package of the type described above with reference to FIG. 1, is carried within the housing 116 and facilitates bi-directional communications between a radiating null antenna element 130 and the donor antenna 112. As in the embodiment of FIG. 1, the radiating element 130 may be a patch or dipole element which is aimed towards the floor of the attic and hence ceiling of a room therebelow for obtaining optimal coverage of that room. A backplane 138 may be of similar dimensions to that described in FIG. 1, that is, a backplane or ground plane for isolation purposes consisting of a rectangle or square on the order of 15 inches on a side, or any other suitable geometry. One or more RF chokes 202 are also shown in FIG. 2 for further enhancing the isolation between the donor and null antennas 112, 114. In this latter regard, isolation of at least on the order from about 30 to about 40 dB, or even about 70 to about 90 or more dB can be obtained with the configuration shown and described in FIG. 2.

As in the embodiment of FIG. 1, the donor antenna 112 of FIG. 2 may be either omnidirectional or directional, and in the latter case, may be provided with some relatively easy to use structure for properly orienting or aiming relative to a cell tower. Also, in the same fashion as described above for the embodiment of FIG. 1, in the embodiment of FIG. 2, the donor antenna and null antenna are polarized with different polarizations, such as orthogonal polarizations with the donor antenna being vertically polarized and the null antenna being horizontally polarized.

Figure 3:
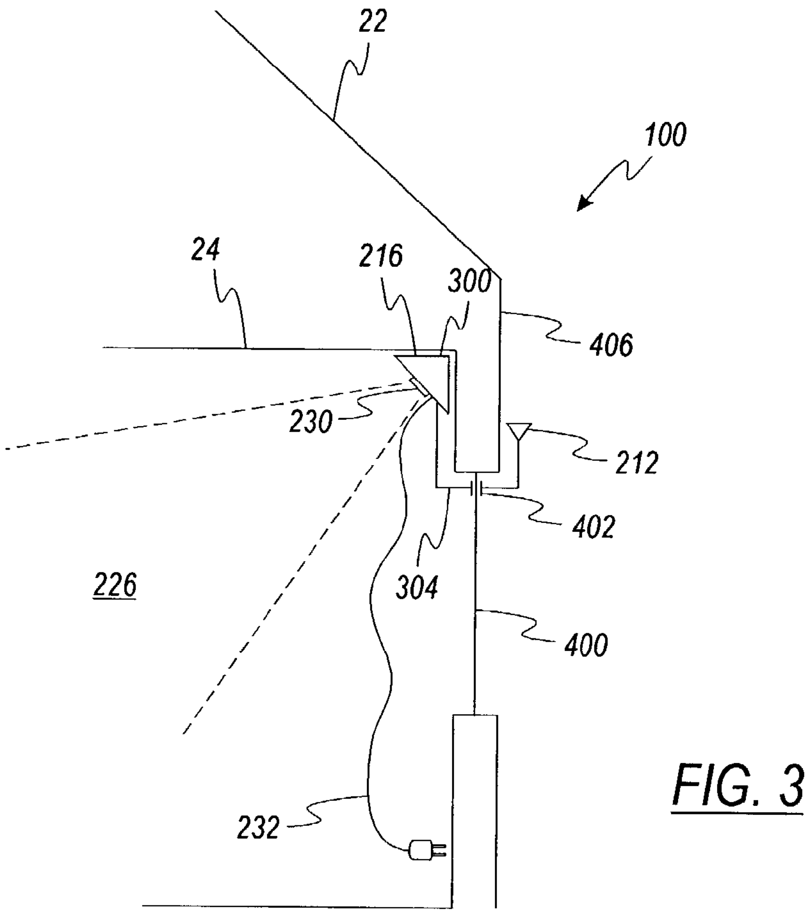
FIG. 3 shows a simplified diagram showing a consumer premises repeater system in accordance with another embodiment of the invention.

Referring now to FIG. 3, like reference numerals are utilized to indicate like elements and components. In FIG. 3, a housing 216 mounts an antenna 230 positioned to radiate within a room 226. This room 226 has a window 400, and a donor antenna 212 may be capacitively coupled to electronics 300 in the housing 216 through the window 400 by a capacitive coupling designated generally by the reference numeral 402. The electronics may receive power from an onboard power supply or AC to DC power converter via an AC power cord 232 which is coupled to a source of household current. Alternatively, the window 400 may be assumed to be substantially transparent to radio frequency whereby the donor antenna 212 may be merely mounted interiorly of the room 226 and adjacent the window 400. However, mounting the antenna 212 outside permits it to be placed higher relative to the structure than illustrated in FIG. 3, if desired, which can enhance signal reception from a cell tower whether the antenna 212 is omnidirectional, or is directional and can be steered or aimed relative to the cell tower, as discussed above for the other embodiments.

Figure 4:
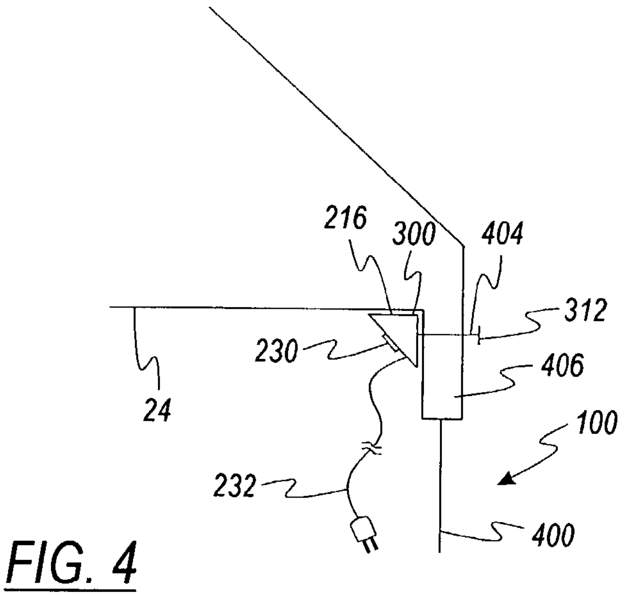
FIG. 4 shows a variation on the embodiment of FIG. 3.

Referring briefly to FIG. 4, again, like elements and components are designated by like reference numerals. In FIG. 4, the donor element 312 is mounted exteriorly of the residential structure and is coupled by a cable 404 through a wall 406 of the structure. This cable 404 is coupled to suitable electronics 300 within the housing 216, which mounts the null antenna 230 as in the embodiment of FIG. 3. The power cord 232 may also be provided in similar fashion to FIG. 3.

In the embodiments of FIGS. 3 and 4, the housing 216 is generally triangular in cross-section, such that the housing may be mounted close to a ceiling 24 of the residential structure and at a corner where the ceiling 24 meets an interior surface of the wall 406. For example, the housing may have a right triangle cross-section, with the surface upon which the null antenna is mounted being disposed at the hypotenuse of the cross-section.

While FIGS. 3 and 4 illustrate the mounting of the housing 216 with respect to an exterior wall, it may also be mounted to an interior wall, if desired, with the cable 304, 404 carrying the RF signal being suitably extended. Moreover, additional housings having antennas and suitable electronics may be placed in other rooms and coupled in daisy chain fashion via a suitable cable as shown, for example, in the embodiment of FIG. 1.

As in the embodiment of FIG. 3, in FIG. 4 the donor antenna 312 may be mounted at any suitable place on the exterior of the residential structure and may be higher than illustrated in FIG. 4 for improved gain.

Figure 5:
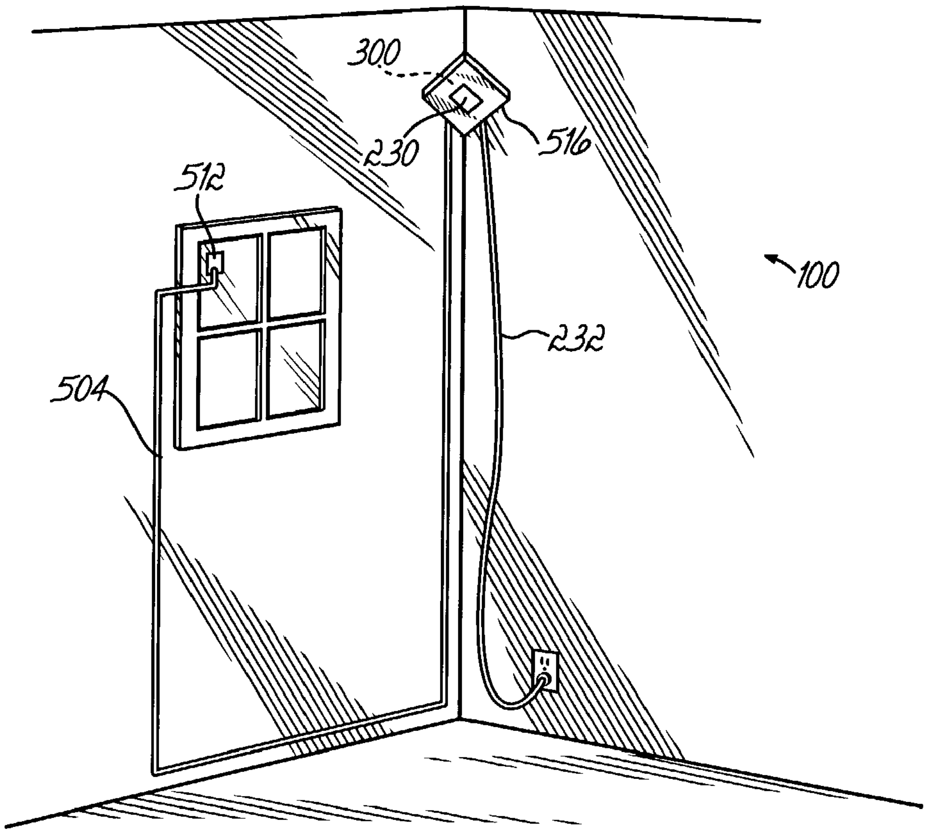
FIG. 5 shows another variation on the embodiment of FIG. 3.

FIG. 5 illustrates yet another variation on the embodiment of FIG. 3, whereby a donor antenna 512 is mounted directly to a window, e.g., via adhesive, suction cups, or other suitable mounting arrangements capable of positioning an antenna upon or adjacent to a window. The donor antenna 512 may be mounted to the inside of the window, and coupled directly to electronics 300 via coax cable 504, or in the alternative, may be mounted to the outside of the window and coupled to the electronics 300 in a housing 516 via capacitive coupling (not shown in FIG. 5). Various routings of cable 504 may be used, e.g., along the ceiling, along the window frame, along the floor, etc.

FIG. 5 also illustrates an alternative configuration of a housing 516, incorporating a diamond or square shape suitable for mounting practically anywhere within a room of a structure with a aid of an appropriate mounting bracket. Such a configuration is suitable for placement in a corner or along one wall of a room, and may also have a bracket suitable for aiming the housing horizontally and/or vertically to optimize the orientation of null antenna 230 for a particular installation.

It will be appreciated that, while the foregoing discussion has focused upon the use of the illustrated repeaters in residential structures such as single family homes, the principles of the invention may apply to other architectural structures, including other residential structures such as town homes, condominiums, apartment buildings, etc., as well as other non-residential structures such as hotels, office buildings, governmental buildings, etc.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A repeater comprising:

a housing configured for mounting within an architectural structure;

a null antenna mounted on the housing and oriented to provide an antenna beam directed into an interior portion of the architectural structure when the housing is mounted to the architectural structure;

a donor antenna; and a repeater circuit disposed in the housing and coupled to the null and donor antennas to provide bi-directional exchange of radio frequency signals therebetween;

wherein the housing is configured to be mounted in a room in the architectural structure, wherein the housing is configured to be mounted within a corner between a ceiling and at least one wall of the room, and wherein the housing is right triangular in cross-section, with the null antenna mounted to a surface of the housing that forms the hypotenuse in the right triangular cross section.

2. The repeater of claim 1, wherein the donor and null antennas are configured to have orthogonal relative polarizations.

3. The repeater of claim 2, wherein the donor antenna is vertically polarized and wherein the null antenna is horizontally polarized.

4. The repeater of claim 1, wherein the donor antenna is configured to be mounted in a spaced apart relationship with respect to the housing.

5. The repeater of claim 4, further comprising a cable coupling the donor antenna to the repeater circuit.

6. The repeater of claim 1, further comprising a backplane mounted on the housing and positioned relative to the null antenna to provide isolation between the null and donor antennas.

7. The repeater of claim 6, further comprising at least one choke surrounding the backplane.

8. The repeater of claim 1, wherein the donor antenna is mounted to and extends from the housing.

9. The repeater of claim 8, wherein the null antenna comprises a patch antenna element mounted to a surface of the housing, and wherein the donor antenna is oriented perpendicular to a surface of the patch antenna element.

10. The repeater of claim 1, further comprising:

at least one second null antenna oriented to provide a second antenna beam directed into a second interior portion of the architectural structure; and a cable operatively coupling the second null antenna with the repeater circuit.

11. The repeater of claim 10, further comprising a second housing to which the second null antenna is mounted.

12. The repeater of claim 1, wherein the donor antenna is configured to be mounted in an attic of an architectural structure at a relatively high point within the attic.

13. The repeater of claim 1, wherein the donor antenna is configured to be mounted on an outside surface of the architectural structure.

14. The repeater of claim 13, wherein the donor antenna is coupled to the repeater circuit via a cable running through a wall of the architectural structure.

15. The repeater of claim 13, wherein the donor antenna is coupled to the repeater circuit through a window in the architectural structure via a capacitive coupler mounted to the window.

16. The repeater of claim 1, wherein the donor antenna is configured to be mounted on a window disposed in the architectural structure.

17. The repeater of claim 1, wherein the housing is configured to be mounted to a wall in the room.

18. The repeater of claim 1, wherein the architectural structure comprises a residential structure.

19. A repeater comprising:

a housing including a planar surface;

a null antenna including at least one patch antenna element disposed on the surface of the housing;

a donor antenna coupled to the housing via a cable; and a repeater circuit disposed in the housing and coupled to the null and donor antennas to provide bi-directional exchange of radio frequency signals therebetween, wherein the housing is configured to be mounted within a corner between a ceiling and at least one wall of an architectural structure, and wherein the housing is triangular in cross-section, with the null antenna mounted to a surface of the housing that faces outwardly from the corner when the housing is mounted within the corner.

20. The repeater of claim 19, wherein the donor antenna is configured to be mounted proximate a relatively high point within the attic, and wherein the null and donor antennas have generally orthogonal polarizations relative to one another.

21. The repeater of claim 19, wherein the housing is configured to be mounted to at least one of a wall and a ceiling in a room of an architectural structure, with the surface oriented to face an interior portion of the room.

22. The repeater of claim 21, wherein the donor antenna is configured to be mounted outside of the architectural structure.

23. The repeater of claim 21, wherein the donor antenna is configured to be mounted to a window in the room.

24. A repeater comprising:

a housing including a planar surface;

a null antenna including at least one patch antenna element disposed on the surface of the housing;

a donor antenna mounted on the housing opposite the surface and extending generally perpendicular to and away from the surface of the housing; and a repeater circuit disposed in the housing and coupled to the null and donor antennas to provide bi-directional exchange of radio frequency signals therebetween, wherein the repeater is configured to be mounted within an attic of an architectural structure proximate a relatively high point within the attic, and with the surface of the housing oriented toward a ceiling of a room disposed below the attic, and wherein the null and donor antennas have generally orthogonal polarizations relative to one another.

25. The repeater of claim 24, wherein the donor antenna is rigidly mounted on the housing.

26. A method of bi-directionally transmitting radio frequency signals in an architectural structure, the method comprising:

receiving a first radio frequency signal from an interior portion of an architectural structure using a null antenna mounted to a housing that is mounted within the architectural structure so as to orient the null antenna toward the interior portion of the architectural structure, wherein the null antenna includes at least one patch antenna element disposed on a surface of the housing and wherein the housing and the null antenna are positioned within an attic of the architectural structure;

communicating the first radio frequency signal to a donor antenna that is mounted on the housing and positioned within the attic with a repeater circuit disposed in the housing;

receiving a second radio frequency signal using the donor antenna; and communicating the second radio signal to the null antenna using the repeater circuit.

27. The method of claim 26, further comprising:

radiating the first radio frequency signal from the donor antenna in a first direction; and radiating the second radio frequency signal from the null antenna in a second direction that is generally orthogonal to the first direction.

28. The method of claim 27, wherein the donor antenna is vertically polarized and wherein the null antenna is horizontally polarized.

29. The method of claim 27, wherein radiating the first radio frequency signal includes radiating the first radio frequency signal omnidirectionally using an omnidirectional antenna for the donor antenna.

30. The method of claim 27, wherein radiating the first radio frequency signal includes radiating the first radio frequency signal directionally using a directional antenna for the donor antenna.

31. The method of claim 26, wherein a backplane is mounted on the housing intermediate the null and donor antennas.

32. The method of claim 31, wherein ate least one choke surrounds the backplane.

33. The method of claim 26, further comprising:

receiving a third radio frequency signal from a second interior portion of the architectural structure using a second null antenna mounted to a second housing that is mounted within the architectural structure so as to orient the second null antenna toward the second interior portion of the architectural structure;

communicating the third radio frequency signal from the second null antenna to the repeater circuit;

communicating the third radio frequency signal to the donor antenna with the repeater circuit; and communicating the second radio signal to the second null antenna using the repeater circuit.

34. The method of claim 26, wherein the architectural structure comprises a residential structure.

35. The method of claim 26, further comprising disabling the null antenna in response to a control signal received by the donor antenna.

36. The method of claim 26, wherein the null antenna includes at least one of a patch antenna element and a dipole antenna element.

37. A method of installing a repeater in an architectural structure, the method comprising:

installing a donor antenna in an attic of an architectural structure, wherein installing the donor antenna in the attic includes positioning the donor antenna at a relatively high point in the attic;

installing a housing in the attic of the architectural structure to orient a null antenna mounted thereto toward a ceiling of a room over which the attic is disposed, wherein installing the housing in the attic includes positioning the housing proximate the ceiling of the room, wherein the housing further includes a repeater circuit disposed therein and coupled to the null and donor antennas to provide bi-directional exchange of radio frequency signals therebetween; and connecting a cable between the donor antenna and the housing.

* * * * *

UNITED STATES PATENT AND TRADEMARK OFFICE

CERTIFICATE OF CORRECTION

PATENT NO. : 7,027,770 B2
APPLICATION NO. : 10/152923
DATED : July 10, 2006
INVENTOR(S) : Mano D. Judd and James L. Alford It is certified that error appears in the above-identified patent and that said Letters Patent is hereby corrected as shown below:

On Title page (item 56)
Page 1 reads

"*Primary Examiner*– Tilahun Gesesse
*Assistant Examiner*– Angelica M. Perez"

and should read -

*Primary Examiner*- Tilahun Gessese
*Assistant Examiner* Angelica M. Perez
Item (74) *Attorney, Agent or Firm* – Wood, Herron & Evans L.L.P.

Column 3, line 4 reads "… higher or lower gains may also be sued."
and should read -- … higher or lower gains may also be used. --

Column 3, line 52 reads "...mounted as a relatively high point in the attic, typically as …" and should read -- … mounted at a relatively high point in the attic, typically as … --.

Column 6, line 22 reads "… a structure with a aid of an appropriate mounting bracket." and should read -- … a structure with aid of an appropriate mounting bracket. --.

Column 8 line 39 reads " ...housing and wherein the housing and the null antenna…" and should read -- … housing, and wherein the housing and the null antenna… --.

UNITED STATES PATENT AND TRADEMARK OFFICE

CERTIFICATE OF CORRECTION

PATENT NO. : 7,027,770 B2 
APPLICATION NO. : 10/152923
DATED : July 10, 2006
INVENTOR(S) : Mano D. Judd and James L. Alford It is certified that error appears in the above-identified patent and that said Letters Patent is hereby corrected as shown below:

Column 9, line 4 reads "32. The method of claim 31, wherein ate least one choke …" and should read -- … 32. The method of claim 31, wherein at least one choke … --.

Signed and Sealed this

Twenty-sixth Day of September, 2006

JON W. DUDAS
*Director of the United States Patent and Trademark Office*

UNITED STATES PATENT AND TRADEMARK OFFICE

CERTIFICATE OF CORRECTION

PATENT NO. : 7,027,770 B2
APPLICATION NO. : 10/152923
DATED : April 11, 2006
INVENTOR(S) : Mano D. Judd and James L. Alford It is certified that error appears in the above-identified patent and that said Letters Patent is hereby corrected as shown below:

On Title page (item 56)
Page 1 reads

*"Primary Examiner–* Tilahun Gesesse
*Assistant Examiner–* Angelica M. Perez"

and should read -

--*Primary Examiner-* Tilahun Gessese
*Assistant Examiner* Angelica M. Perez--
Item (74) *Attorney, Agent or Firm* – Wood, Herron & Evans L.L.P.

Column 3, line 4 reads "… higher or lower gains may also be sued." and should read -- … higher or lower gains may also be used. --

Column 3, line 52 reads "...mounted as a relatively high point in the attic, typically as …" and should read -- … mounted at a relatively high point in the attic, typically as … --.

Column 6, line 22 reads "… a structure with a aid of an appropriate mounting bracket." and should read -- … a structure with aid of an appropriate mounting bracket. --.

Column 8 line 39 reads " ...housing and wherein the housing and the null antenna…" and should read -- … housing, and wherein the housing and the null antenna… --.

UNITED STATES PATENT AND TRADEMARK OFFICE

CERTIFICATE OF CORRECTION

PATENT NO. : 7,027,770 B2
APPLICATION NO. : 10/152923
DATED : April 11, 2006
INVENTOR(S) : Mano D. Judd and James L. Alford It is certified that error appears in the above-identified patent and that said Letters Patent is hereby corrected as shown below:

Column 9, line 4 reads “32. The method of claim 31, wherein ate least one choke …” and should read -- … 32. The method of claim 31, wherein at least one choke … --.

This certificate supersedes Certificate of Correction issued September 26, 2006.

Signed and Sealed this

Twenty-first Day of November, 2006

JON W. DUDAS
*Director of the United States Patent and Trademark Office*